(12) United States Patent
Henn et al.

(10) Patent No.: US 6,859,879 B2
(45) Date of Patent: Feb. 22, 2005

(54) METHOD AND SYSTEM FOR SECURE PERVASIVE ACCESS

(75) Inventors: Horst Henn, Boeblingen (DE); Dirk Herrendoerfer, Sindelfingen (DE); Thomas Schaeck, Achern (DE); Roland Weber, Karlsruhe (DE)

(73) Assignee: International Business Machine Corporation, Armonk, NY (US)

( * ) Notice: Subject to any disclaimer, the term of this patent is extended or adjusted under 35 U.S.C. 154(b) by 678 days.

(21) Appl. No.: 09/810,354

(22) Filed: Mar. 16, 2001

(65) Prior Publication Data

US 2004/0139349 A1 Jul. 15, 2004

(30) Foreign Application Priority Data

May 26, 2000 (EP) .............................. 00111338

(51) Int. Cl.$^7$ .............................................. G06F 17/00
(52) U.S. Cl. ....................... 713/200; 713/151; 713/152
(58) Field of Search ................................. 713/150–153, 713/200–202, 168–171, 182–186; 709/220–226, 200–203

(56) References Cited

U.S. PATENT DOCUMENTS

| | | | | |
|---|---|---|---|---|
| 6,601,102 B2 | * | 7/2003 | Eldridge et al. | ............ 713/182 |
| 6,606,663 B1 | * | 8/2003 | Liao et al. | .................. 713/201 |
| 6,647,260 B2 | * | 11/2003 | Dusse et al. | ................ 713/169 |
| 6,704,873 B1 | * | 3/2004 | Underwood | ................ 709/223 |
| 6,708,212 B2 | * | 3/2004 | Porras et al. | ............... 709/224 |
| 6,775,692 B1 | * | 8/2004 | Albert et al. | ............... 713/201 |

FOREIGN PATENT DOCUMENTS

| WO | WO 00 02358 A | 1/2000 | ........... H04L/29/06 |
|---|---|---|---|
| WO | WO 00 11832 A | 3/2000 | ........... H04L/29/06 |

OTHER PUBLICATIONS

Integration of legacy client–server applications in a secure multi–tier architecture Cotroneo, D.; Mazzeo, A.; Romano, L.; Russo, S.; Parallel, Distributed and Network–based Processing, 2002. Proceedings. 10th Euromicro Workshop on , Jan. 9–11, 2002.*

Dynamic authentication for high–performance networked applications Schneck, P.A.; Schwan, K.; Quality of Service, 1998. (IWQoS 98) 1998 Sixth International Workshop on , May 18–20, 1998.*

An implementation of MLS on a network of workstations using X.500/509 Davis, J.; Jacobson, D.; Bridges, S.; Wright, K.; Performance, Computing, and Communications Conference, 1997. IPCCC 1997., IEEE International , Feb. 5–7, 1997.*

* cited by examiner

Primary Examiner—David Jung
(74) Attorney, Agent, or Firm—Jeanine S. Ray-Yarletts; Jerry W. Herndon; Ronald A. D'Alessandro

(57) ABSTRACT

The present invention relates to a client-server system having a security system for controlling access to application functions. The security system separated from the clients and the application functions routes all incoming requests created by various PVC-devices to a centralized security system providing an authentication component and a security component. The authentication component provides several authentication mechanisms which may be selected by information contained in the client's request. The authentication mechanism may be changed or extended without changing conditions on the client as well on the server or application side. The security component provides a security policy describing security requirements for accessing application functions which may be invoked by the security component. If the selected authentication mechanism succeeds and fulfills the security policy associated to that application function then the application function will be invoked by the security component.

15 Claims, 4 Drawing Sheets

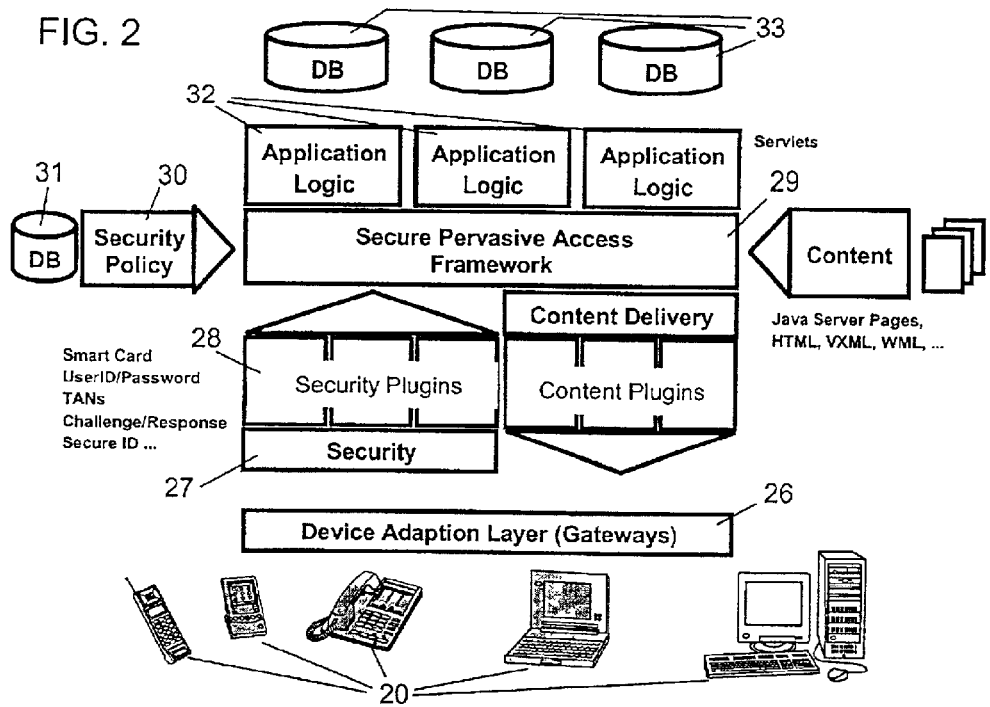
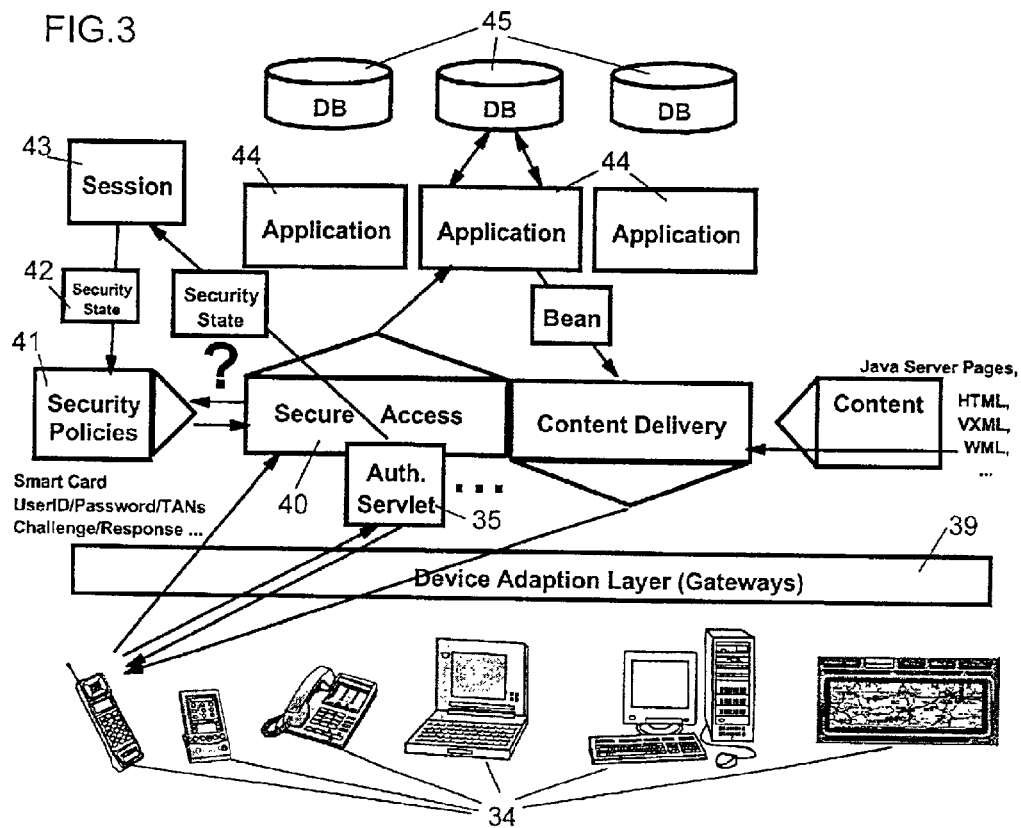

METHOD AND SYSTEM FOR SECURE PERVASIVE ACCESS

TECHNICAL FIELD

The present invention relates to method and system for controlling access from different Pervasing Computing Devices (PVC-devices) to applications installed on or accessible via a server.

BACKGROUND OF THE INVENTION

PVC-devices, e.g. personal digital assistants, mobile phones, chipcards etc., are frequently used to gather information or to use business transactions applications stored on server, e.g. application for electronic payments or application for electronic shopping.

Wireless PVC-devices like personal digital assistants and mobile phones communicate via gateway and Internet to a server which offers access to Web pages or business transaction application. Other PVC-devices like chipcards may use a LAN, Intranet or Internet to communicate with the said server.

A main problem of communication between different PVC-devices and the business transaction applications is the security. Normally each business transaction application may use its own security requirements depending on the type of PVC-device, the type of user and type of communication.

Security requirements may consist of an authentication level, a confidentiality level and an endorsement level. PVC-devices can establish a certain authentication level by performing appropriate authentication protocol and a certain level of confidentiality by employing appropriate encryption to secure communication between the server and certain level of endorsement.

Today, to applicant's knowledge, no secure, integrated solution for security based access control from various PVC-devices to applications/functions on a server exists. Applications are mostly developed to support few devices. Security requirements and authentication code are mostly buried in the application code.

In current PVC-applications, it is difficult to add support for additional PVC-devices and authentication mechanism. In most cases, applications allow for at most one authentication mechanism, mostly coupled with an application.

It is therefore the object of the present invention to provide a system and method for a security based access control from various PVC-devices to applications which is independent from any client or application.

This object is solved by the features of the independent claims. Preferred embodiments of the present invention are laid down in the dependent claims.

SUMMARY OF THE INVENTION

The present invention relates to a client-server system having a security system for controlling access to application functions. The security system separated from the clients and the application functions routes all incoming requests created by various PVC-devices to a centralized security system providing an authentication component and a security component. The authentication component provides several authentication mechanisms which may be selected by information contained in the client's request. The authentication mechanism may be changed or extended without changing conditions on the client as well on the server or application side. The security component provides a security policy describing security requirements for accessing application functions which may be invoked by the security component. If the selected authentication mechanism succeeds and fulfills the security policy associated to that application function then the application function will be invoked by the security component.

In a preferred embodiment, the present invention provides a session object for each PVC-device that communicates with the server. One of the session object's attributes is a security state. The security state at least indicates the level of security of authentication and/or the level of confidentiality of communication with the PVC-device. The server has a security policy, that determines which application function may be invoked at what security level. Application functions on a server can only be invoked via the Secure Pervasive Access Framework (SPAF). For each request to invoke an application function, SPAF checks whether the security state of the client device satisfies the access conditions defined in the security policy for that application function; only if this is the case, SPAF invokes the requested application function.

Preferably all incoming requests are routed through the Device Adaptation Layer. This layer includes different kinds of gateways that convert device specific requests to a canonical form, i.e. HTTP requests that carry information about the device type and the desired reply content type, e.g. HTML, WML or VXML. Examples of such gateways are voice gateways with a VXML browser that recognizes speech and generates HTTP requests that carry text and selected options or a WAP gateway that connects the WAP protocol stack to the Internet protocol stack.

SPAF checks all incoming requests and invokes application function according to the associated security policies, which may be stored in a special database, for example. The security policies may be very different, for example one non-sensitive application function may only have functions that are accessible to everybody, while another application may have certain functions that may only be performed by clients that have been authenticated by the security module using a cryptographic protocol.

Calls of application functions by SPAF result in execution of application logic, maybe including access to databases or legacy systems in the background and some output that must be delivered to the user. All information to be displayed is prepared by the application logic and passed to the content delivery module. The content delivery module renders this information into content that depends on the device type and desired reply content type.

BRIEF DESCRIPTION OF THE DRAWINGS

The present invention will be better understood and its numerous objects and advantages will become more apparent to those skilled in the art by reference to the following drawings, in conjunction with the accompanying specification, in which FIG. 2 shows the secure pervasive access architecture as used by the present invention FIG. 3 shows authentication and access via secure pervasive access as used by the present invention

DETAILED DESCRIPTION OF THE PREFERRED EMBODIMENT

Before going into details of specific embodiments, it will be helpful to understand from a more general perspective the various elements and methods which may be related to the present invention.

An important feature of the present invention is the Secure Pervasive Access Framework (SPAF). SPAF builds the interface to various components of the invention. It receives the requests from the different PVC-devices, checks the security state of the respective PVC-device and gives access to the requested functions/application if the access conditions defined by the security policy are fulfilled. The security state of the respective PVC-device may be checked by its own programs, e.g. plug-ins, using authentication mechanism like password/userID, challenge response, digital signature and so on. These plug-ins are totally independent from any application/function to be accessed. Access to an application/function will be exclusively controlled by the SPAF via the security policy. The security level of a certain application/function may be changed without changing the application function to be accessed. The application logic itself remains unchanged. This is an important advantage of the present invention.

Another feature of the present invention—which may be used optionally—is the Device Adaptation Layer (DAL).

It receives device specific requests and generates a canonical form which is able to specify information about the device type and the desired reply content. The information contained in the canonical request is used for executing the respective authentication mechanism by using the appropriate plug-in. The DAL is able to support any protocol, e.g. HTTPS and WAP.

Figure 1:
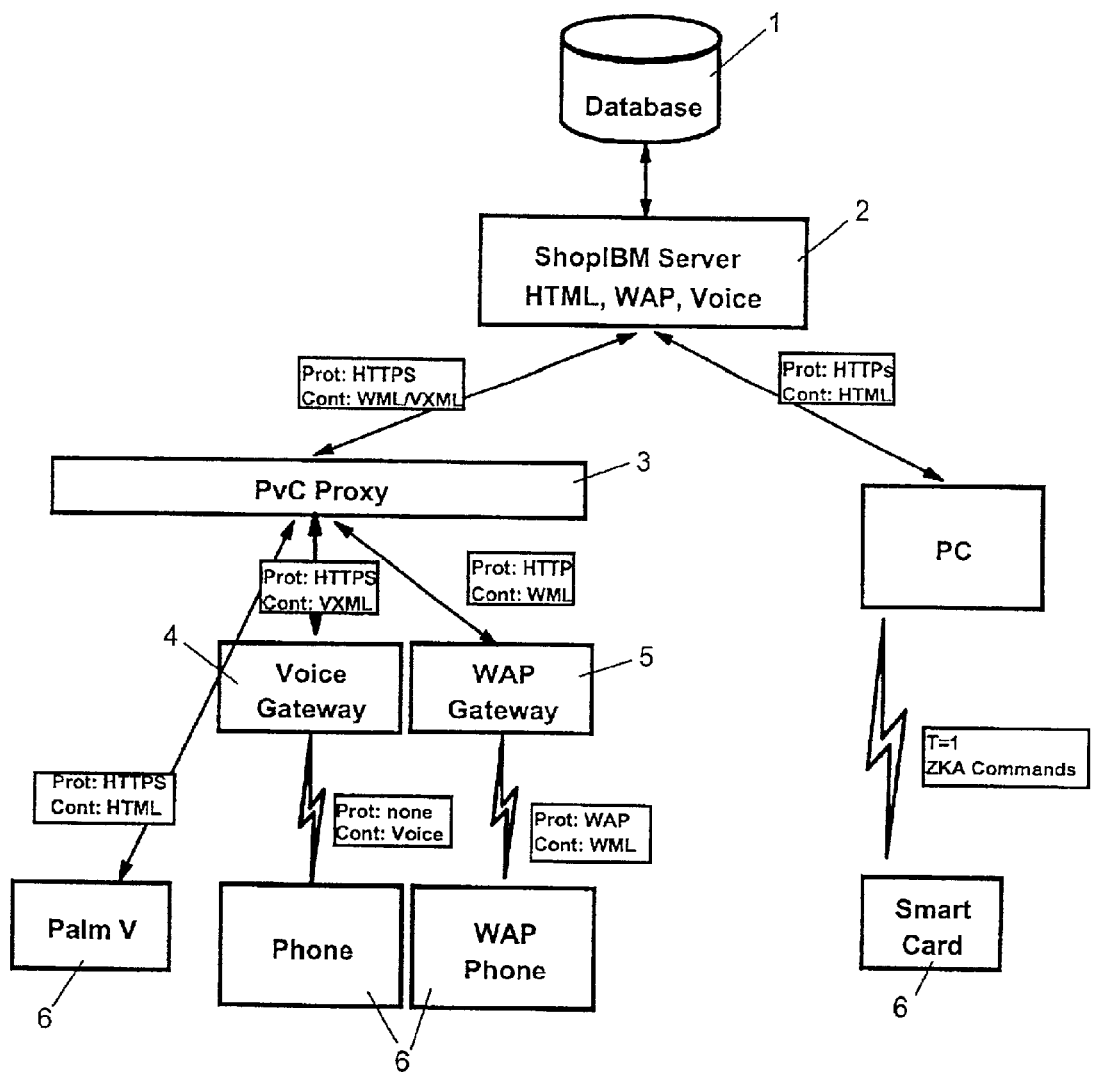
FIG. 1 shows a communication architecture in which the present invention may be used

FIG. 1 provides a view of a communication architecture in which the present invention may be used preferably. Currently many PVC-devices (6) are available on the market. The famous PVC-devices are personal digital assistants, mobile phones or WAP phones and chipcards.

One Server (2) hosts application functions (1) which may be accessed from different PVC-devices (6) with different levels of authentication and different levels of confidentiality to exchanged data. The other server hosts a PVC-Proxy (3), the Voice Gateway (4) and the WAP Gateway (5).

The PVC-Proxy (3) allows connections to be established to different kinds of PVC-devices (6) and maintains session information (cookies) and device type information for these connections. Connections to clients can be established directly or via the Voice Gateway (4) or WAP Gateway (5). Each incoming request is augmented by the session and devices type information before forwarding it to its destination.

The Voice Gateway (4) includes speech recognition and speech synthesis. It converts voice input from a telephone to HTTP requests and responses containing VXML-like content back to voice.

The WAP Gateway (5) forwards WAP requests as HTTP requests to a server and returns the HTTP responses to devices as WAP responses.

Which content representation has to be used for a particular request is determined by the device info that comes with each request. Which session info has to be used is determined by the cookie information that is contained in each request. Setting the cookie information and the device info to appropriate values is the responsibility of the PVC-Proxy.

FIG. 2 provides a drawing of a preferred implementation of a secure pervasive access architecture.

The secure pervasive access architecture preferably comprises following components:

a Device Adaptation Layer (DAL; 26) as gateway for the different PVC-devices (20) authentication component (27) comprising one or more security plug-ins (SP; 28) for executing the authentication mechanism a Secure Pervasive Access Framework (SPAF; 29)

a security policy (30) which is preferably laid down in a data base (31) accessible by the server several access protected application functions (32) located on the server or on a data base (33) accessible by the server The communication structure between these components is as follows: The single PVC-device (20) generates a device specific request and sends it to the DAL (26). Requests are routed through the DAL. Preferably the DAL includes different kinds of gateways that convert device specific requests into a canonical form, e.g. HTTP requests that includes information about device type and desired reply content type, e.g. HTML, WML or VXML. The appropriate security plug-ins (28) is selected based on the information contained in the request and an authentication mechanism as laid down in the selected security plug-in (28) will be executed. The result of the authentication for the PVC-device called security state is stored in a non-volatile memory of the server. Then, the SPAF (29) compares the security state of a PVC-device with the associated security policy (30) for that application function (32) and invokes the application function (32) according to the security policy. The security policy (30) comprises correlation of security levels concerning defined user-actions for accessing application functions. For example, the security policy may be implemented in a table in which each application function could have one or more correlations of security level concerning defined user-actions of that application function. The security policy may be different depending from the type of information to be accessed or type of PVC-device. For example one non-sensitive application function may only have function accessible to everybody, while another application function may have functions that may only be performed by PVC-devices that have been authenticated by the security plug-ins or security modules using cryptographic protocol. The security policy may be stored in a special data base.

SPAF compares the security state delivered by the security plug-in with the security policy associated with the respective application function. If the security state of the PVC-device satisfies the access conditions defined by the security policy the SPAF invokes the requested application function.

FIG. 3 provides a drawing showing authentication and access via secure pervasive access.

PVC-devices (34) like mobile, personal digital assistants, chipcards generate a device specific request and send that request to the DAF (39). If a conversion is required DAF converts the device specific request into a canonical request including a cookie. A cookie contains a packet of information which the server sends to DAF or the PVC-device to be sent back by the DAF or PVC device every time it reconnects with the that server. Cookies are mainly used to authenticate the PVC-device against the server. Some PVC-devices do not support handling of cookies, e.g. WAP phone or personal digital assistant. For these devices DAF (39) offers the functionality to support cookies. Cookies will be generated as follows: PVC-device initiates by means of requests a communication via DAF (if necessary) with the SPAF (40) offering access to applications. The request contains information for authentication of the PVC-device, e.g. userID and/or password.

The security plug-in or authentication servlets (35) uses a specific authentication mechanism and if the authentication succeeds then the SPAF (40) creates a new session object with an associated session ID (43). Then the SPAF (40) uses the security state for the already authenticated PVC-device comprising the result of the authentication and authentication information or parts of it contained in the request of the PVC-device and puts the security state (42) into the session object. SPAF (40) assigns a sessionID to the PVC-device and returns a response with a cookie containing the sessionID. The PVC device or DAF receives the response and stores the cookie. Each subsequent request sent back by the PVC device to the SPAF contains that cookie.

The PVC-device (34) sends new request to the SPAF to access an application function, e.g. query confidential information. SPAF gets the sessionID from the cookie contained in that request, looks for the session object associated with that sessionID from the cookie and gets the security state contained in that session object. Then, SPAF checks the security state contained in that session object with the security policy (41). If the security state (42) satisfies the security policy (41) the SPAF invokes the requested application function and returns a response. The PVC-device displays the response.

Figure 4:
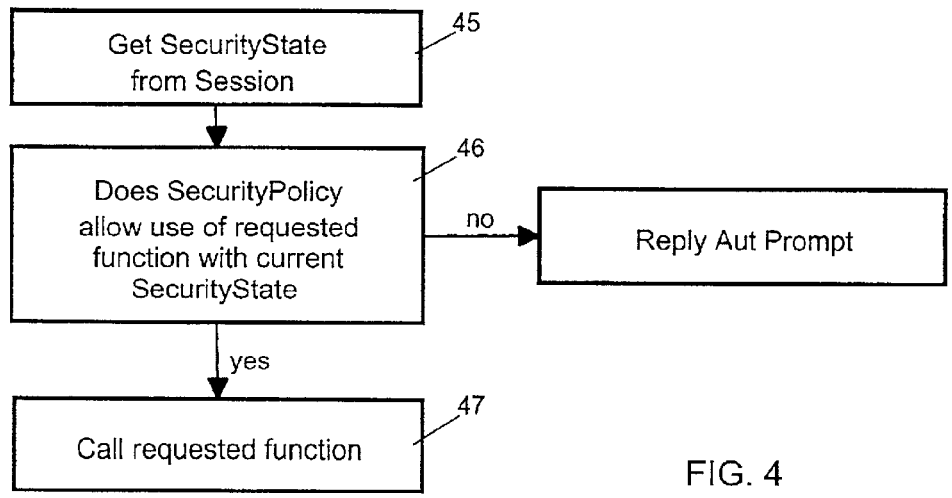
FIG. 4 shows the basic method steps of the present invention

FIG. 4 provides a diagram showing the basic method steps of the present invention.

The basic method comprises the step of getting the security state from the session (45), checking the received security state with the security policy (46) and calling the requested application function (47) if the security policy allows access to that application function. The security state will be preferably handled by security plug-ins as already explained above. Each plug-in contains one authentication mechanism, e.g. authentication by userID/password, Challenge/Response, digital signature. The plug-ins are independent from the application function to be invoked.

The method steps for checking the received security state and allowing access to the desired application function are laid down in the Secure Pervasive Access Framework (SPAF). SPAF has an common interface to the accessible application functions.

Figure 5:
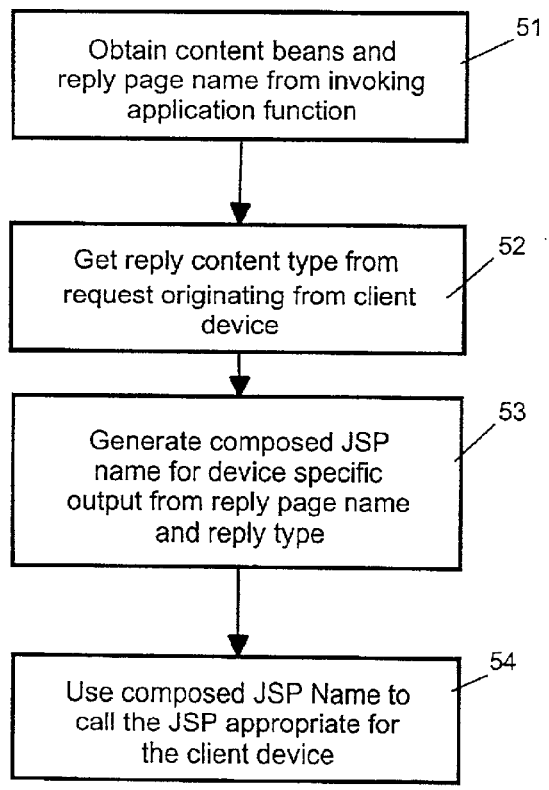
FIG. 5 shows the method of the delivery module as preferably used by the present invention

FIG. 5 provides the method steps of the Delivery Module for each outgoing response.

The Delivery Module renders the information into content that depends on the device type and desired reply content type. Which content of representation has to be used for a particular request is determined by the device info contained in each request (51, 52). For each content type, e.g. HTML, WML or VXML, there are different kind of Java Server Pager (JSPs) for content rendering. A JSP can be used to generate arbitrary content by using the appropriate JSP tag to define the desired content type (53, 54).

Figure 6:
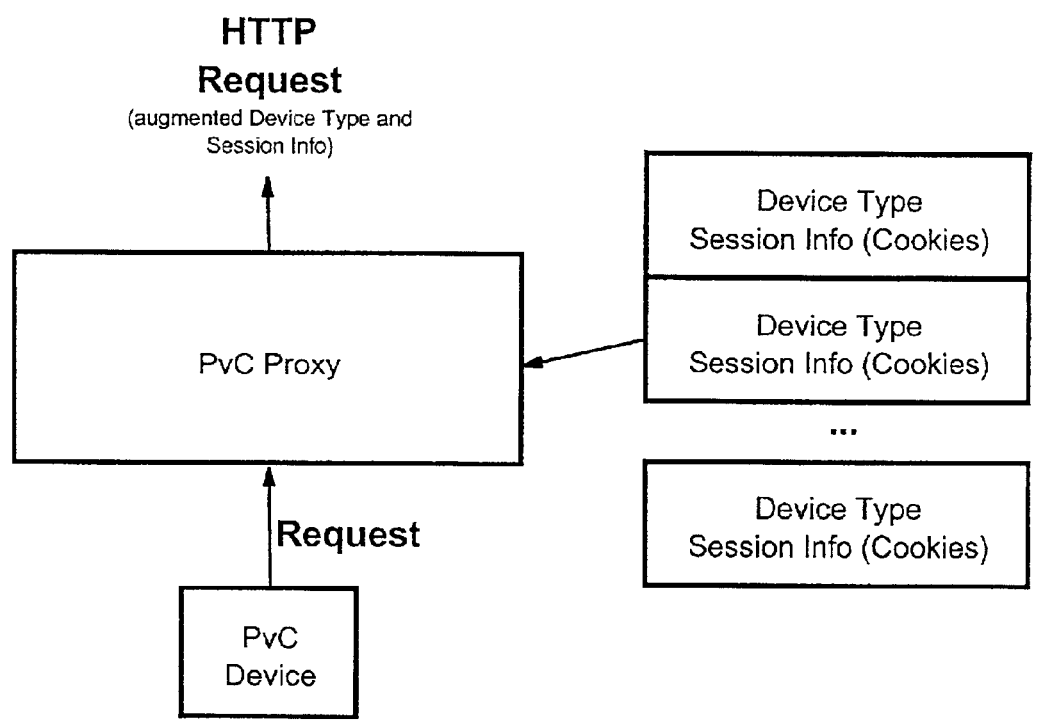
FIG. 6 shows the method of the PVC-Proxy as preferably used by the present invention

FIG. 6 provides the basic functionality of the PVC proxy. As already explained above, the PVC-proxy supports those PVC-devices which do not support handling of cookies. The proxy receives the cookies sent by the server and includes the cookie in the request of the appropriate PVC-device. Furthermore, the PVC-proxy converts the PVC-device specific requests into canonical requests as far it is required.

What is claimed is:

1. A security system for controlling access to one or more application functions located on a server or accessible via server, each application function having an associated security level, wherein one or more clients communicate with said server by means of requests for accessing one of said application functions using network, wherein access to said application functions is controlled by security requirements, comprising:

an authentication component functionally separated from said clients and said application functions for processing said client request independently of said client type, containing more than one authentication mechanisms and selecting and executing an authentication mechanism from said more than one authentication mechanisms based on the information contained in the client request resulting in a security state;

a security component containing a security policy describing security requirements (security level) for accessing application functions, comparing said security state associated with said client with the security level of the application function on and allowing access to the application function if the security state fulfills the security level.

2. A system according to claim 1, wherein said clients are PVC-devices.

3. A system according to claim 2 further comprising:

a component (ADL) for converting PVC-device specific requests into canonical requests before said request is used by said authentication component.

4. A system according to claim 1, wherein said authentication component and said security component are integrated in one component stored on a server.

5. A system according to claim 1, whereby said authentication component consists of security plug-ins whereby each authentication mechanism is laid down in a separate security plug-in.

6. A system according to claim 5, whereby the authentication mechanism may be UserID/Password, Challenge/Response or digital signature.

7. A method for controlling access to one or more application functions stored on a server or accessible via server, each application function having an associated security level, wherein one or more clients communicate with said server by means of requests for accessing one of said application functions using a network, whereby access to said application functions is controlled by a security requirements, comprising the steps of:

routing all incoming requests created by said clients to an authentication component which is functionally independent from said clients and said application functions, said authentication component comprising the steps of:

authentication of said client by determining an authentication mechanism provided by said authentication component by means of authentication information contained in said request and applying said authentication mechanism;

storing a result of said authentication and said authentication information or parts of it contained in said request as a security state;

using security requirements for said one of said application functions to be accessed;

comparing said stored security state with said security requirements for accessing the requested application function; and invoking said requested application function if said security state fulfills said security requirements.

8. A method according to claim 7 wherein said incoming requests are canonical requests.

9. A method according to claim 8 wherein said canonical requests are created by a Device Adaptation Layer which converts client specific requests into canonical requests.

10. A method according to claim 7 comprising the further steps of:
    creating a session identifier when establishing a communication between a client and a server and using said session identifier in all requests and responses between said client end said server.

11. A method according to claim 10 whereby said session identifier and said security state are placed in a cookie, whereby said cookie is inserted into each request and response between said client and said server.

12. A method according to claim 7 wherein said clients are PVC-devices.

13. A computer program comprising computer program code portions for performing respective steps of the method according to claims 7 to 12 when the program is executed in a computer.

14. A computer program product stored on a computer-readable media containing software code for performing of the method according to one of the claims 7 to 12 if the program product is executed on the computer.

15. A client-server system, wherein one or more clients, having client types, communicate with a server by means of requests for accessing application functions located on or accessible via said server, wherein access to said application functions is controlled by a security system located on said server, wherein said security system comprises:
    an authentication component, functionally separated from said one or more clients and said application functions for processing client request independently of client type, containing a plurality of authentication mechanisms and selecting and executing an authentication mechanism from said a plurality of authentication mechanisms based on the information contained in the client request, resulting in a security state;
    a security component containing a security policy describing security requirements (security level) for accessing application functions, comparing said security state associated to a client with the security level of the application function an allowing access to the specified application function if the security state fulfills the security level.

\* \* \* \* \*